(12) United States Patent
Kitajima

(10) Patent No.: US 8,947,554 B2
(45) Date of Patent: Feb. 3, 2015

(54) METHOD FOR PROCESSING IMAGE, IMAGE PROCESSING APPARATUS, AND IMAGING APPARATUS

(75) Inventor: Kotaro Kitajima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 603 days.

(21) Appl. No.: 12/973,683

(22) Filed: Dec. 20, 2010

(65) Prior Publication Data

US 2011/0157402 A1 Jun. 30, 2011

(30) Foreign Application Priority Data

Dec. 25, 2009 (JP) ................................. 2009-295433

(51) Int. Cl.
| H04N 9/73 | (2006.01) |
| H04N 9/68 | (2006.01) |
| H04N 5/14 | (2006.01) |
| H04N 9/77 | (2006.01) |

(52) U.S. Cl.
CPC ................ H04N 9/68 (2013.01); H04N 5/142 (2013.01); H04N 9/77 (2013.01)
USPC ....................................... 348/223.1; 382/167

(58) Field of Classification Search
USPC .............. 348/222.1, 223.1; 382/167; 358/520
See application file for complete search history.

(56) References Cited

U.S. PATENT DOCUMENTS

| 6,618,079 | B1 * | 9/2003 | Higuchi ..................... 348/223.1 |
| 6,788,812 | B1 * | 9/2004 | Wilkins ...................... 382/167 |
| 6,963,362 | B1 * | 11/2005 | Nakayama ................ 348/224.1 |
| 7,085,009 | B2 * | 8/2006 | Kawai et al. .................. 358/1.9 |
| 2003/0020736 | A1 * | 1/2003 | Kimura et al. ............... 345/690 |
| 2005/0185839 | A1 * | 8/2005 | Matsubara ................... 382/167 |
| 2006/0280361 | A1 * | 12/2006 | Umeda ........................ 382/167 |
| 2008/0068468 | A1 * | 3/2008 | Kitajima .................... 348/223.1 |
| 2010/0002104 | A1 * | 1/2010 | On et al. ...................... 348/252 |

FOREIGN PATENT DOCUMENTS

| CN | 1856117 A | 11/2006 |
| JP | 10-200764 A | 7/1998 |
| JP | 2000-224607 A | 8/2000 |
| JP | 2000-259372 A | 9/2000 |
| JP | 04958969 B2 | 6/2012 |

* cited by examiner

*Primary Examiner* — Paul Berardesca
(74) *Attorney, Agent, or Firm* — Canon USA, Inc., I.P. Division

(57) ABSTRACT

A method for processing image includes: acquiring image data; firstly correcting saturation information acquired from the image data based on at least one of hue information and luminance information of the image data; determining whether an image of the image data is a vivid color scene based on the saturation information corrected by the first correction; and outputting a result of scene determination.

25 Claims, 14 Drawing Sheets

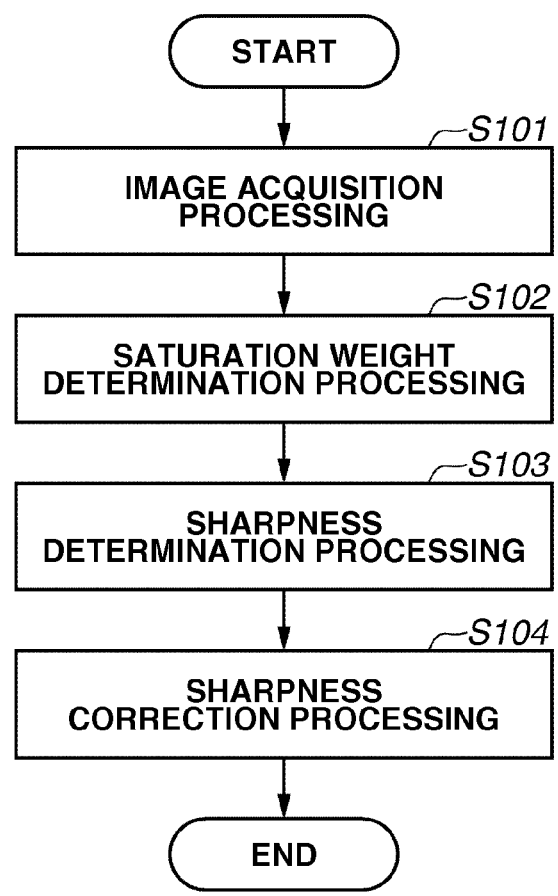

HUE HISTOGRAM

BLOCK WITH HUE Hp

BLOCK WITH HUE Hp

METHOD FOR PROCESSING IMAGE, IMAGE PROCESSING APPARATUS, AND IMAGING APPARATUS

BACKGROUND OF THE INVENTION

1. Field of the Invention

The present invention relates to a method for processing image for determining a scene of an input image and processing the input image based on a result of scene determination, and also relates to an image processing apparatus and an imaging apparatus.

2. Description of the Related Art

Some of conventional image processing apparatuses determine a scene and a subject type of an input image, and perform image processing based on the determined scene (subject type).

For example, Japanese Patent Application Laid-Open No. 2000-259372 discusses an image output apparatus which determines whether an input image is a vivid color scene (subject) and outputs an image of a vivid color scene with a high resolution.

The above-mentioned conventional technique discussed in Japanese Patent Application Laid-Open No. 2000-259372 determines whether the input image is a vivid color scene according to whether the image includes more high-saturation pixels than a predetermined threshold value.

However, because of the human sense of color and the distribution of subjects in nature, each individual subject may or may not be vivid depending on the color output even with an identical saturation. Accordingly, there has been an issue that, when all colors are processed with a uniform saturation threshold value, a scene should not be vivid such as a scene in which grass throughout the screen, may be vivid.

SUMMARY OF THE INVENTION

The present invention provides an image processing apparatus that enables determining whether an input image is a vivid color scene. According to the present invention, correcting the saturation in association with the hue and luminance of the input image makes it possible to determine whether the input image is a vivid color scene.

According to an aspect of the present invention, a method for processing image includes: acquiring image data; firstly correcting saturation information acquired from the image data based on at least one of hue information and luminance information of the image data; determining whether an image of the image data is a vivid color scene based on the saturation information corrected by the first correction; and outputting a result of scene determination.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1B is a flow chart illustrating basic imaging processing.

DESCRIPTION OF THE EMBODIMENTS

Various exemplary embodiments, features, and aspects of the invention will be described in detail below with reference to the drawings.

An imaging apparatus according to a first exemplary embodiment will be described below, as an exemplary image processing apparatus, with reference to FIGS. 1 to 6.

Figure 1A:
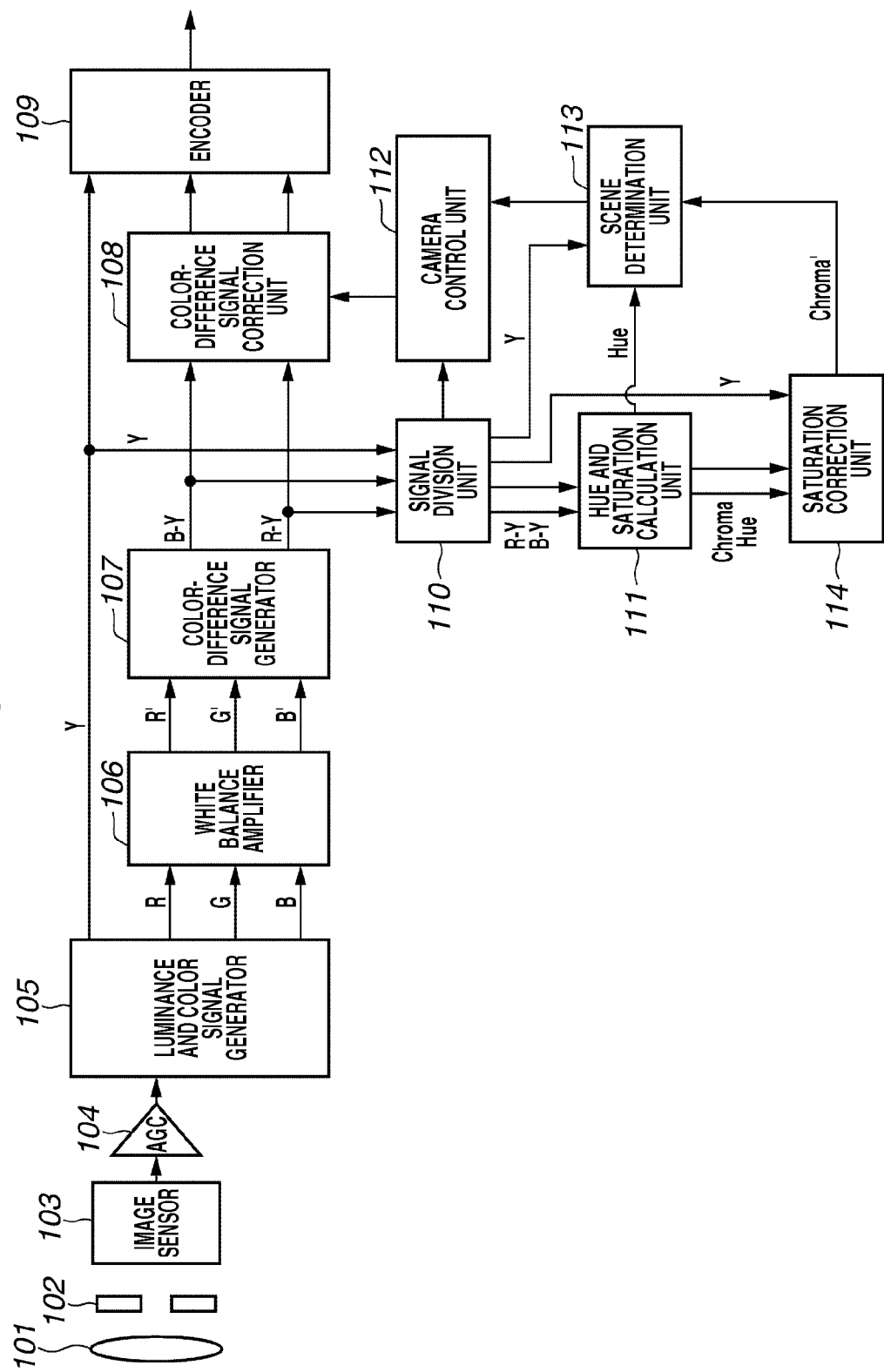
FIG. 1A is a block diagram illustrating a configuration of a first exemplary embodiment.

FIG. 1 is a block diagram illustrating a configuration of the imaging apparatus capable of detecting a scene of a captured image and correcting the image based on the scene.

Each block in FIG. 1 will be described below. Referring to FIG. 1, a lens 101 focuses light flux from a subject. A diaphragm 102 narrows the light flux guided from the lens 101 to an image sensor 103. The image sensor 103 performs photoelectric conversion of the received light flux and outputs an image signal. An automatic gain control amplifier (AGC) 104 amplifies the image signal from the image sensor 103 to a suitable level.

A luminance and color signal generator 105 converts the signal generated by the image sensor 103 into a luminance signal (Y) and color signals (R, G, and B). A white balance amplifier 106 amplifies the color signals (R, G, and B) output from the luminance and color signal generator 105 according to a white balance gain to generate amplified color signals (R', G', and B'). A color-difference signal generator 107 generates color-difference signals (R−Y and B−Y). The color-difference signal correction unit 108 corrects the color-difference signals, for example, multiplies them by the gain. An encoder 109 converts the color-difference signals into a standard television signal.

A signal division unit 110 divides the luminance signal (Y) and the color-difference signals (R−Y and B−Y) into predetermined small blocks. A hue and saturation calculation unit 111 calculates color phase (Hue) and saturation (Chroma) signals from the color-difference signals (R−Y and B−Y). A camera control unit 112 controls the entire imaging system by instructing each unit of the imaging apparatus to perform necessary processing (not illustrated). A scene determination unit 113 determines a scene of an input image. A saturation correction unit 114 corrects a saturation value.

Imaging operations by the imaging apparatus will be described below with reference to FIG. 1. The image sensor 103 photoelectrically converts the input light into an electrical signal. The AGC amplifier 104 amplifies the signal to a suitable level and outputs the amplified signal to the luminance and color signal generator 105. The luminance and color signal generator 105 generates the luminance signal (Y) and the color signals (R, G, and B) from the image signal formed by the image sensor 103, and outputs the color signals (R, G, and B) to the white balance amplifier 106.

The white balance amplifier 106 amplifies the color signals (R, G, and B) based on a white balance gain calculated by the camera control unit 112, and outputs the amplified color signals (R', G', and B') to the color-difference signal generator 107. The color-difference signal generator 107 generates the color-difference signals (R−Y and B−Y) from the color signals (R', G', and B'), and outputs the signals to the color-difference signal correction unit 108 and the signal division unit 110. The color-difference signal correction unit 108 multiplies the color-difference signals (R−Y and B−Y) by a gain G calculated by the camera control unit 112 (equal to or larger than 1 to correct the color-difference signals. The intensity of the gain G will be described below.) Therefore, corrected color difference signals are given as follows.

(R−Y)'=G×(R−Y), (B−Y)'=G×(B−Y). Then, the color-difference signal correction unit 108 outputs the corrected color-difference signals ((R−Y)' and (B−Y)') to the encoder 109.

The encoder 109 generates a standard television signal, such as NTSC, from the luminance signal (Y) and the color-difference signals (R−Y)' and (B−Y)', and outputs the standard television signal.

Basic processing for imaging has been described above. FIG. 1B is a flow chart illustrating processing for detecting a scene of a captured image and correcting the image based on the scene. This processing is performed by the camera control unit 112 or each unit instructed by the camera control unit 112.

In step S101 (image acquisition step), the color-difference signal correction unit 108 acquires image data output from the color-difference signal generator 107. In step S102 (first correction step), the color-difference signal correction unit 108 performs the saturation weight determination processing to weight the saturation obtained from the image data in association with the characteristics of the image data to enable scene determination based on the human eyes visual interpretation of color. In step S103 (determination step), the color-difference signal correction unit 108 performs the vividness determination processing to determine whether the image of the obtained image data is a vivid color scene using the saturation information and the luminance information after weighting. In step S104 (second correction step), the color-difference signal correction unit 108 performs the vividness correction processing to correct the saturation of the image data based on a result of the vividness determination processing in step S103, and the processing ends. The vividness weight determination processing, vividness determination processing, and vividness correction processing will be described below.

Although the result of scene determination is reflected in the image data used therefor in the present exemplary embodiment, the use of the result of scene determination is not limited thereto in the present invention. Specifically, it is naturally possible to reflect the correction processing based on the result of scene determination for a certain frame (image data) in subsequent frames. It is also possible to identify a scene from the result of scene determination for a plurality of frames, for example, identify a scene when a result of vivid color scene determination is obtained in succession for a plurality of frames or when scenes determined to be a vivid color scene have a high rate among a plurality of frames. In this case, it is also possible to reflect the correction processing based on the result of scene determination in the plurality of frames and subsequent frames.

More specifically, a situation is assumed where an information processing apparatus, such as an imaging apparatus capable of capturing a still image and a personal computer (PC) capable of image processing for image data, processes captured image data (frame). It is also assumed that an information processing apparatus, such as an imaging apparatus capable of live viewing or moving image capturing and a PC capable of image processing for a moving image, performs the above-mentioned processing over a plurality of frames.

Although saturation correction is applied to image data using the result of scene determination output by the scene determination unit 113 in the present exemplary embodiment, the use of the result of scene determination is not limited thereto. For example, the result of scene determination can be displayed in a display unit (not illustrated) for notification to a user. Further, if information associated with the result of scene determination is attached to a header when storing image data, a captured scene of image data can be identified based on the attached information after storing the image data. Further, correction processing may be performed such that any quantity other than the saturation is corrected to emphasize the sharpness. Possible correction processing includes, for example, increasing the luminance and processing for emphasizing the contour.

Processing for analyzing the characteristics of an image signal will be described below. The signal division unit 110 divides an image signal into a plurality of blocks (8×8 blocks) as illustrate in FIG. 2, calculates average values of the luminance signal (Y) and the color-difference signals (R−Y and B−Y) for each block, and outputs the color-difference signals to the hue and saturation calculation unit 111.

The hue and saturation calculation unit 111 acquires hue information and saturation information for each block through calculation of the color-difference signals R−Y and B−Y. The color phase (Hue) and saturation (Chroma) are calculated by the following formulas.

$$\text{Hue}=\arctan((R-Y)/(B-Y))$$

$$\text{Chroma}=\sqrt{(R-Y)^2+(B-Y)^2} \quad (1)$$

The hue and saturation calculation unit 111 outputs the calculated color phase (Hue) and saturation (Chroma) of each block to the saturation correction unit 114. The signal division unit 110 also outputs the calculated luminance (Y) of each block to the saturation correction unit 114.

The saturation correction unit 114 weights the saturation (Chroma) based on the input color phase (Hue) and luminance (Y) of each block so that the saturation is corrected by increasing the saturation. Processing flow (first correction step) by the saturation correction unit 114 will be described below with reference to FIG. 3.

Figure 2:
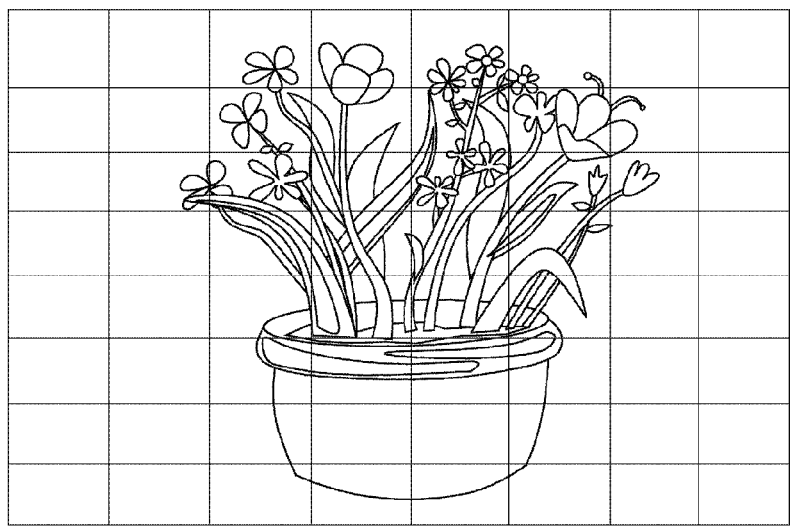
FIG. 2 illustrates block division of an image signal.
Figure 3:
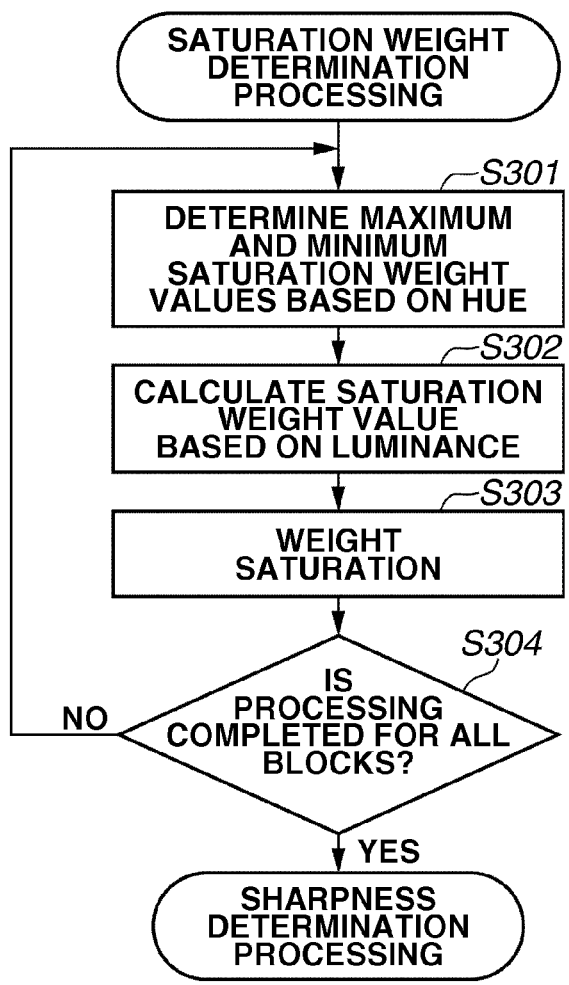
FIG. 3 is a flow chart illustrating processing by a saturation correction unit according to the first exemplary embodiment.

Referring to FIG. 3, the saturation correction unit 114 performs loop processing for the 8×8 blocks illustrated in FIG. 2. Specifically, the saturation correction unit 114 repetitively performs the processing of steps S301 to 303 for all blocks in FIG. 2.

Figure 4A:
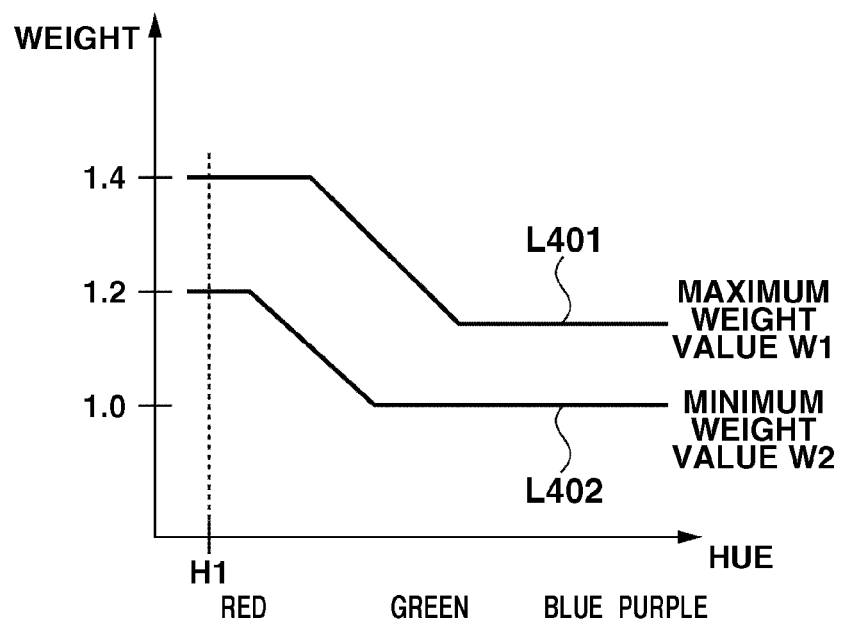
FIGS. 4A and 4B are graphs illustrating the characteristics of the saturation correction unit according to the first exemplary embodiment.

In step S301, the saturation correction unit 114 determines maximum and minimum saturation weight values based on the color phase (Hue) of each block. This processing will be described below with reference to FIG. 4A. FIG. 4A illustrates a relation between the color phase (Hue) and the maximum and minimum saturation weight values. L401 in FIG. 4A illustrates the characteristics of the maximum weight value, and L402 in FIG. 4A illustrates the characteristics of the minimum weight value. The weight and the maximum weight value for each Hue value can be calculated from the characteristics L401 and L402 illustrated in FIG. 4A. For example, with a Hue H1 (red), the minimum weight value equals 1.2, and the maximum weight value equals 1.4. As illustrated in FIG. 4A, human eyes are more likely to feel the red hue more vivid than the blue hue even with identical parameters other than the hue. To apply this characteristic, in the present exemplary embodiment, the saturation weight is varied depending on the hue to achieve saturation correction even with identical condition. Regarding specific method to vary the saturation weight, although the saturation can be defined by the wavelength, the saturation weight for each hue is experientially set taking the human eyes interpretation of color into consideration in the present exemplary embodiment.

Figure 4B:
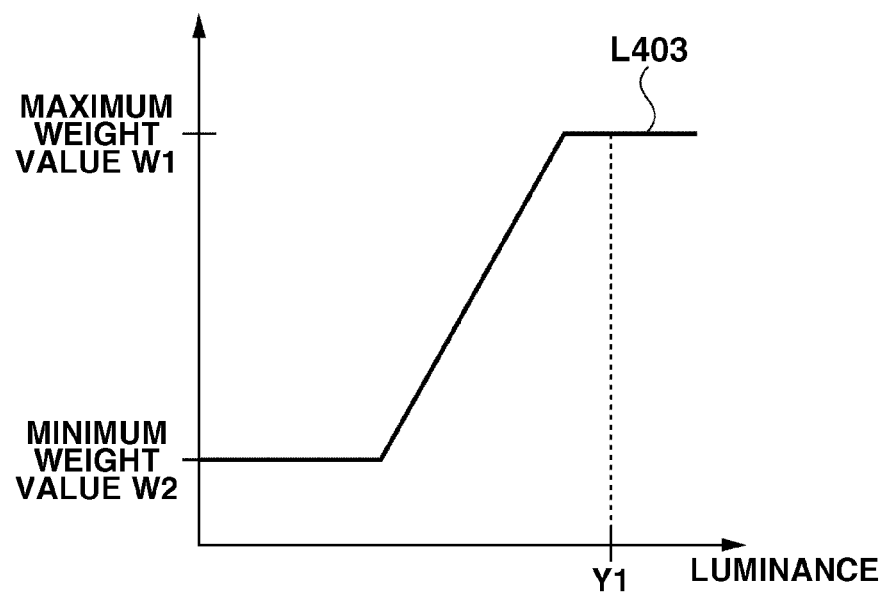

Returning to FIG. 3, in step S302, the saturation correction unit 114 determines the saturation weight based on the maximum weight value, minimum weight value, and luminance (Y) of each block calculated in step S301. This processing will be described below with reference to FIG. 4B. FIG. 4B illustrates a relation between the luminance (Y) of each block and the maximum and minimum saturation weight values. L403 in FIG. 4B illustrates the characteristics of the luminance (Y) of each block and the weight. Further, a maximum weight value W1 is the maximum weight value calculated in step S301, and a minimum weight value W2 is the minimum weight values calculated in step S301. For example, with the hue H1 in FIG. 4A, the maximum weight value W1 equals 1.4 and the minimum weight value W2 equals 1.2 in FIG. 4B. In this case, with a luminance Y1 of each block, the final maximum weight W1 equals 1.4. As illustrated in FIG. 4B, the human sense of color is more likely to feed a high-luminance image more vivid than a low-luminance image even with identical parameters other than the luminance. To apply this characteristics, in the present exemplary embodiment, the saturation weight is set so that the saturation for a high-luminance image (first block having first luminance) is increased more than a low-luminance image, having a lower luminance than the high-luminance image, (second block having second luminance) to achieve saturation correction.

Returning to FIG. 3, in step S303, the saturation correction unit 114 multiplies the saturation (Chroma) by the determined saturation weight to obtain a corrected saturation. In the above-mentioned example, since the weight is 1.4, the corrected saturation (Chroma') of each block equals 1.4× Chroma.

The saturation correction processing by the saturation correction unit 114 has been described above. The saturation correction unit 114 performs the above-mentioned saturation correction processing for all blocks illustrated in FIG. 2, and outputs the corrected saturation (Chroma') to the scene determination unit 113. Further, the signal division unit 110 outputs the luminance (Y) of each block to the scene determination unit 113. The hue and saturation calculation unit 111 outputs the color phase (Hue) of each block to the scene determination unit 113.

The scene determination unit 113 determines whether a captured scene is a vivid color scene based on the input luminance (Y) and the color phase (Hue) of each block, and corrected saturation (Chroma'). The sharpness determination processing (determination step) by the scene determination unit 113 will be described below with reference to FIG. 5.

Figure 5:
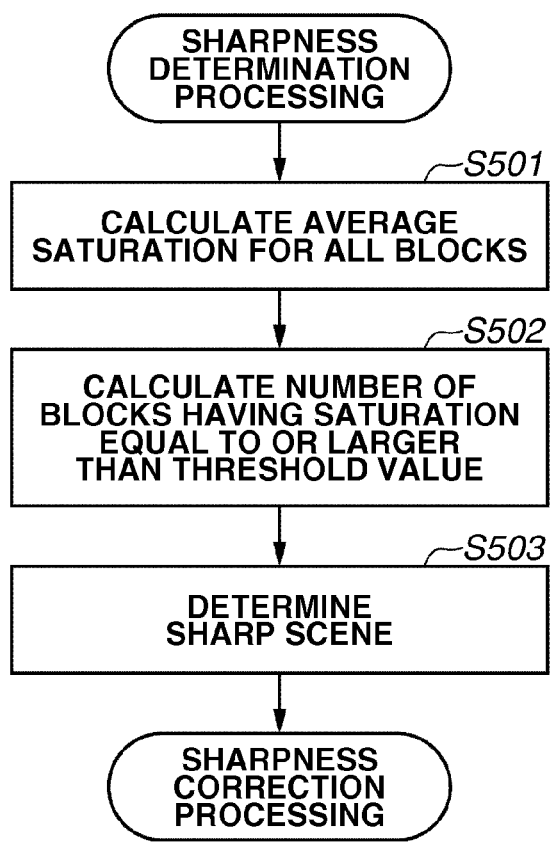
FIG. 5 is a flow chart illustrating processing by a scene determination unit.

Referring to FIG. 5, in step S501, the scene determination unit 113 averages for all blocks in FIG. 2 the corrected saturation (Chroma') calculated by the saturation correction unit 114 to obtain an average saturation value.

In step S502, the scene determination unit 113 counts the number of blocks having a corrected saturation (Chroma') equal to or larger than a predetermined threshold value, among all blocks in FIG. 2.

Figure 6:
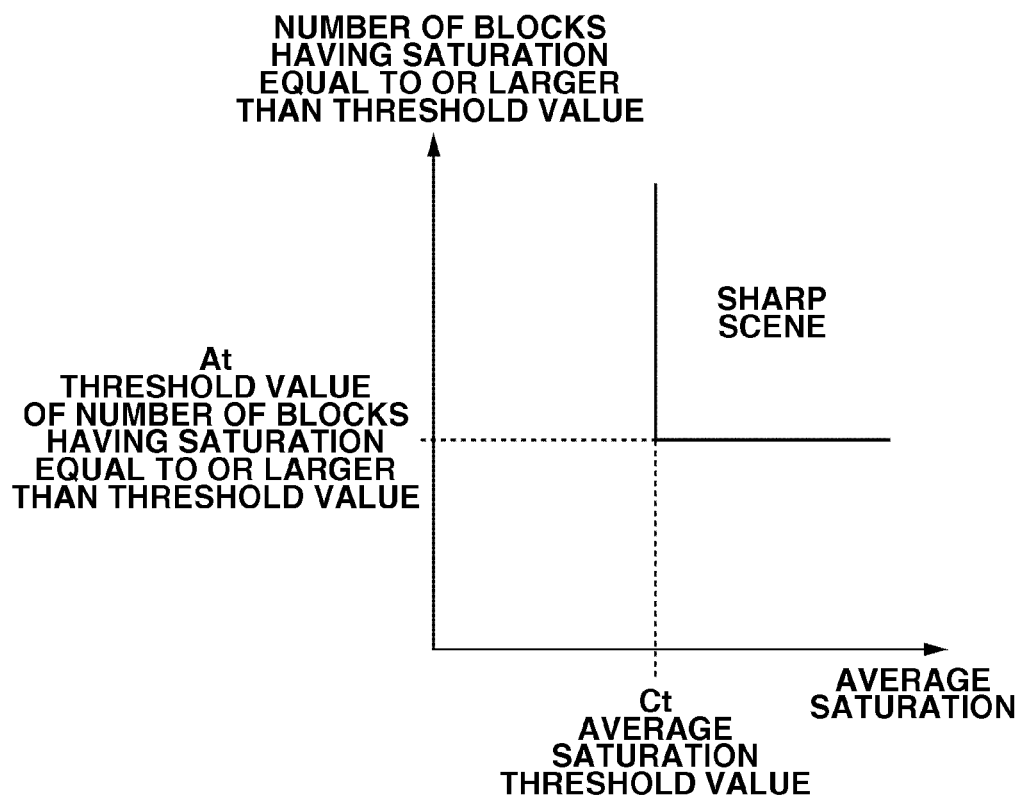
FIG. 6 is a graph illustrating the characteristics of scene determination by the scene determination unit.

In step 503, the scene determination unit 113 determines whether the captured scene is a vivid color scene based on the average saturation value for all blocks obtained in step S501 and the number of blocks having a saturation is equal to or larger than a threshold value obtained in step S502. FIG. 6 illustrates a reference for vivid color scene determination for the average saturation value and the number of blocks having a saturation equal to or larger than a threshold value. As illustrated in FIG. 6, when the average saturation value is higher than an average saturation threshold value Ct (sixth threshold value) and the number of blocks having a saturation equal to or larger than a threshold value (fourth threshold value) exceeds a threshold value At (fifth threshold value), the scene determination unit 113 determines that the captured scene is a vivid color scene.

The processing by the scene determination unit 113 has been described above. The scene determination unit 113 outputs the information about the vivid color scene determination to the camera control unit 112.

The camera control unit 112 controls the parameters of the color-difference signal correction unit 108 based on the information about the vivid color scene determination by the scene determination unit 113 (second correction step). In the present exemplary embodiment, the camera control unit 112 controls the color-difference gain G of the color-difference signal correction unit 108. The color-difference gain G includes parameters G1 and G2 having a relation G1>G2≥1. When the scene determination unit 113 determines that the captured scene is a vivid color scene, the camera control unit 112 sets a color-difference gain G1. Otherwise, it sets a color-difference gain G2. Specifically, in this case, the camera control unit 112 sets a higher gain for the color-difference signals than a gain that would otherwise be set, to increase the saturation to correct the image by emphasizing the vividness.

As described above, an image processing apparatus according to the present exemplary embodiment determines whether a captured scene is a vivid color scene and controls image processing based on the result of scene determination by calculating the saturation, luminance, and hue of an image signal and correcting the saturation based on information about the hue and luminance. Further, the scene determination unit 113 determines whether the captured scene is a vivid color scene using the corrected saturation.

The above-mentioned configuration can correct the saturation value depending on the human eyes visual interpretation of color, enabling vivid color scene determination according to the human eyes visual interpretation of color.

Although the saturation is weighted based on both the luminance and hue in the present exemplary embodiment, the saturation may be weighted based on either one of the hue and saturation.

Although the hue and saturation are calculated from the color-difference signals in the present exemplary embodiment, a method of hue and saturation calculation is not limited thereto. For example, the hue and saturation may be calculated in other spaces such as the L*a*b* space after space conversion.

Although the signal division unit 110 divides an image signal into 8×8 blocks in the present exemplary embodiment, the image signal may be divided into any desired number of blocks. Further, the saturation is weighted on a pixel basis.

Although the gain by which the color-difference signals are multiplied is controlled according to a result of vivid color scene determination in the present exemplary embodiment, the control may be performed in any way as long as the color signals or luminance signal are controlled to be corrected based on a result of scene determination.

In the present exemplary embodiment, the scene determination unit 113 determines whether a captured scene is a vivid color scene based on two pieces of information, i.e., the average saturation value and the number of blocks having a saturation equal to or larger than a threshold value. However, the method of vivid color scene determination is not limited thereto but may be any desired method based on saturation information corrected using the hue and luminance.

Although the scene determination unit 113 determines whether a captured scene is a vivid color scene based on two different values in the present exemplary embodiment, a plurality of values such as the vividness may be used. In this case, the higher the average saturation value and the larger the number of blocks having a saturation equal to or larger than a threshold value, the higher the vividness. The correction intensity of the signal of the color-difference signal correction unit 108 is controlled based on a calculated vividness. (In other words, the higher the vividness, the higher the gain by which the color-difference signals are multiplied.)

Although the present exemplary embodiment has specifically been described based on processing for increasing the saturation for image data determined to be a vivid color scene to emphasize the vividness, the present exemplary embodiment is also applicable to such processing that decreases the saturation for a vivid color scene to suppress the vividness. In this case, gains may be set to satisfy, for example, $G1<G2\leq 1$.

An imaging apparatus according to a second exemplary embodiment of the present invention will be described below with reference to FIGS. 7 to 9. The second exemplary embodiment will be described below based on saturation correction based on the area of color in addition to the hue and luminance described in the first exemplary embodiment.

The block diagram of the imaging apparatus according to the present exemplary embodiment is similar to that in FIG. 1 and therefore duplicated descriptions will be omitted. The present exemplary embodiment differs from the first exemplary embodiment in the processing by the saturation correction unit 114 in FIG. 1. Specifically, the weight calculated by the saturation correction unit 114 is varied depending on the occupancy ratio of a target color in image data, i.e., the area of color.

The processing (first correction step) by the saturation correction unit 114 will be described below with reference to FIG. 7.

Figure 7A:
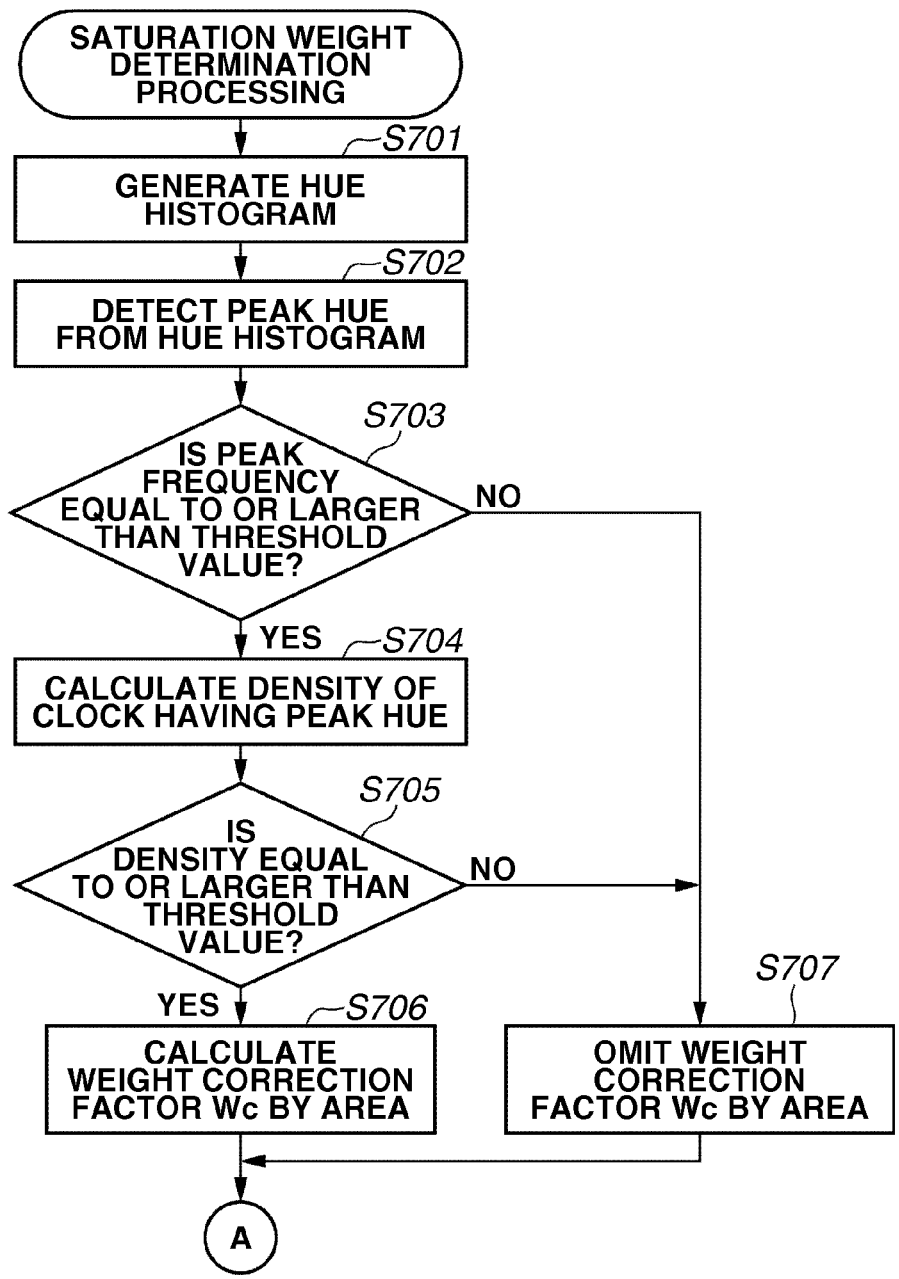
FIG. 7 is a flow chart illustrating processing by the saturation correction unit according to a second exemplary embodiment.
Figure 7B:
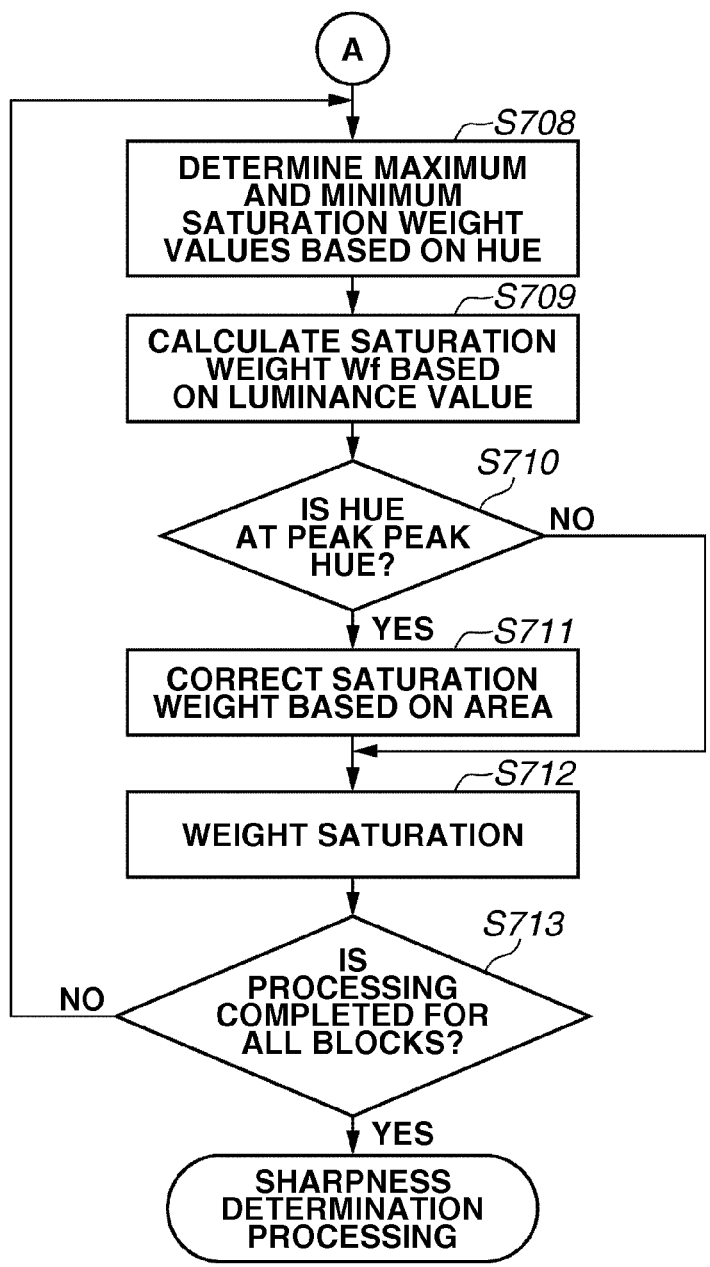
Figure 8A:
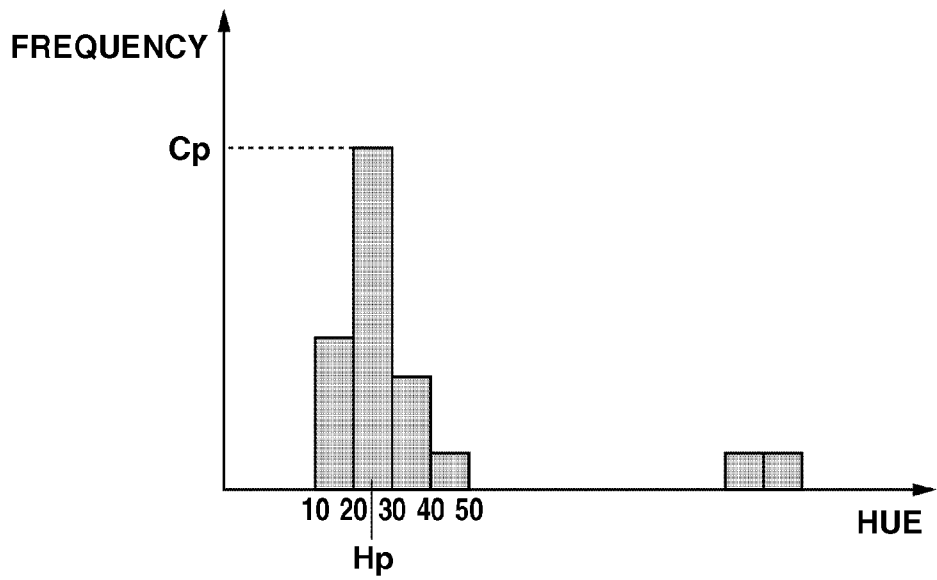
FIGS. 8A to 8C illustrate an exemplary processing by the saturation correction unit according to the second exemplary embodiment.

Referring to FIG. 7, in step S701, the saturation correction unit 114 generates a hue histogram. The hue histogram counts the frequency for each hue in all blocks illustrated in FIG. 2. An exemplary hue histogram with the hue divided in 10-degree steps is illustrated in FIG. 8A. Referring to FIG. 8A, the horizontal axis is assigned the hue and the vertical axis is assigned the frequency.

In step S702, the saturation correction unit 114 detects a peak hue having the highest frequency from the generated hue histogram. Referring to FIG. 8A, a hue Hp (20 to 30 degrees) is a peak hue. Further, Cp indicates a frequency of the hue Hp.

In step S703, the saturation correction unit 114 determines whether the frequency of the peak hue is equal to or larger than a threshold value (whether the area of the peak hue in the image is equal to or larger than a threshold value). Referring to FIG. 8A, the saturation correction unit 114 determines whether the frequency Cp of the peak hue Hp is equal to or larger than a threshold value (first threshold value). When the frequency Cp of the peak hue Hp is equal to or larger than the threshold value (YES in step S703), the processing proceeds to step S704. Otherwise, when the frequency Cp is smaller than the threshold value (NO in step S703), the processing proceeds to step S707.

Figure 8B:
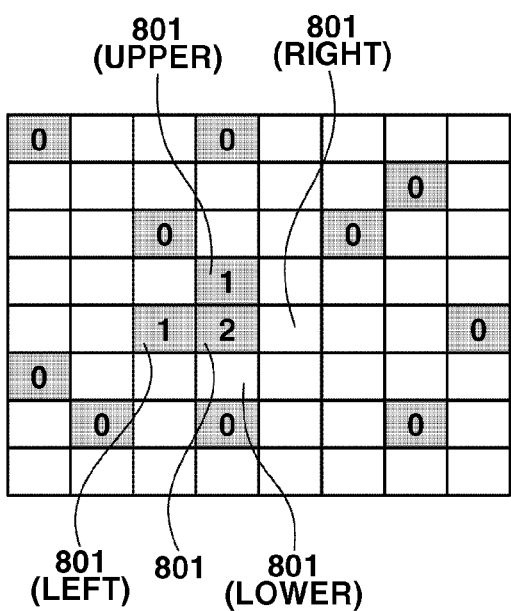
Figure 8C:
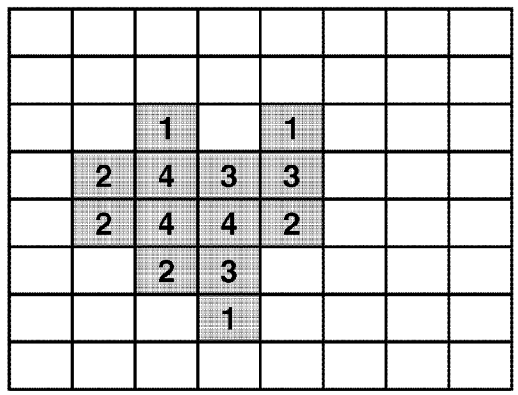

In step S704, the saturation correction unit 114 calculates the density of blocks having the peak hue. A method of density calculation will be described below with reference to FIGS. 8B and 8C. First of all, the saturation correction unit 114 determines whether a captured scene is a block having the peak hue Hp (20 to 30 degrees in the example in FIG. 8A) for all blocks, and attaches a label to each block having the peak hue Hp. Then, the saturation correction unit 114 checks whether each of the upper, lower, right, and left blocks around a labeled block having the peak hue has the hue Hp. The saturation correction unit 114 counts the number of blocks having the hue Hp. This processing will be described below with reference to FIG. 8B. Referring to FIG. 8B, shaded blocks are blocks having the hue Hp. For example, the saturation correction unit 114 checks whether each of the upper, lower, right, and left blocks 801 around a block 801 having the hue Hp has the hue Hp. In this case, since the upper block 801 and the left block 801 have the hue Hp, the number of blocks 801 is 2. Similarly, the saturation correction unit 114 counts the number of upper, lower, right, and left blocks having the hue Hp around each of all blocks having the hue Hp. The numerical values described in FIG. 8B denote the number of blocks having the hue Hp around each of all blocks having the hue Hp. A sum of all these numerical values is defined as density. The example in FIG. 8B gives a density of 4. Similar to FIG. 8B, the example in FIG. 8C gives a density of 32. Thus, the larger the number of blocks having the hue Hp placed together, the higher becomes the density.

Returning to FIG. 7, in step S705, the saturation correction unit 114 determines whether the calculated density is equal to or larger than a threshold value (second threshold value). When the density is equal to or larger than the threshold value (YES in step S705), the processing proceeds to step S706. Otherwise, when the density is smaller than the threshold value (NO in step S705), the processing proceeds to step S707.

In step S706, the saturation correction unit 114 calculates the saturation weight correction factor We based on the area of color having the hue Hp. The area of color having the hue Hp equals the frequency Cp (FIG. 8A) in the hue histogram.

Figure 9A:
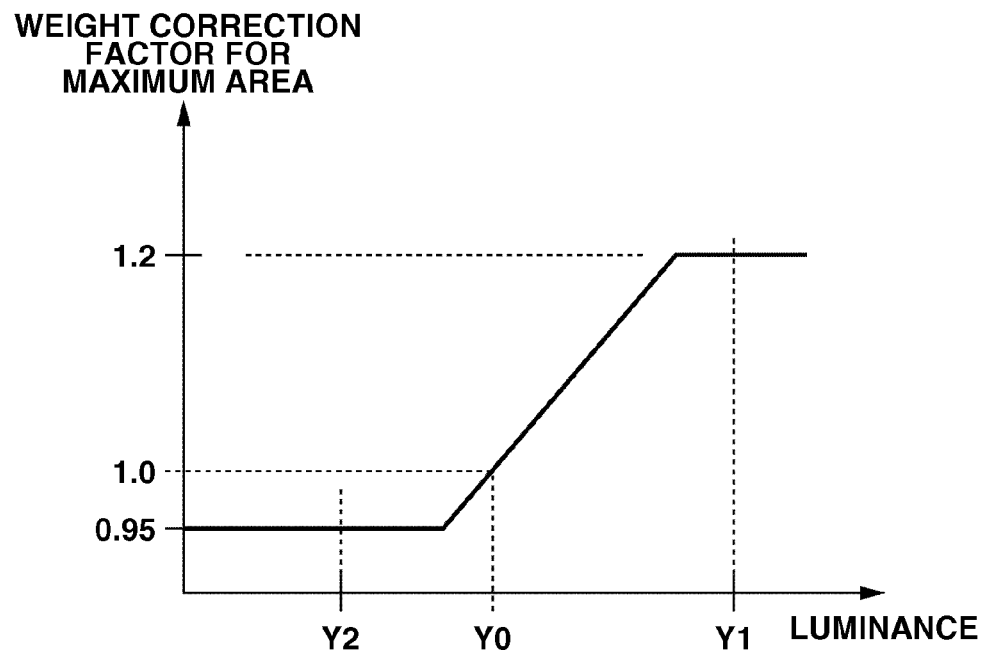
FIGS. 9A and 9B are graphs illustrating the characteristics of the saturation correction unit according to the second exemplary embodiment.

Calculation of the saturation weight correction factor We will be described below. First of all, the saturation correction unit 114 calculates an average luminance Ya of blocks having the hue Hp. Based on the calculated average luminance Ya, the saturation correction unit 114 determines a saturation weight correction factor for the maximum area. FIG. 9A is a graph illustrating a relation between the saturation weight correction factor for the maximum area and the luminance. According to this graph, the saturation correction unit 114 calculates a saturation weight correction factor for the maximum area from the average luminance Ya of areas having the hue Hp. Referring to the graph in FIG. 9A, the saturation weight correction factor for the maximum area is 1.2 for the luminance Y1, the saturation weight correction factor for the maximum area is 0.95 for the luminance Y2. Further, when the average luminance Ya is equal to or larger than a threshold value Y0 (third threshold value), the saturation weight correction factor is equal to or larger than one and saturation weight correction will be performed so that the saturation is increased. Conversely, when the average luminance Ya is smaller than a threshold value Y0, the saturation weight correction factor is smaller than one and saturation weight correction will be performed so that the saturation is decreased.

Figure 9B:
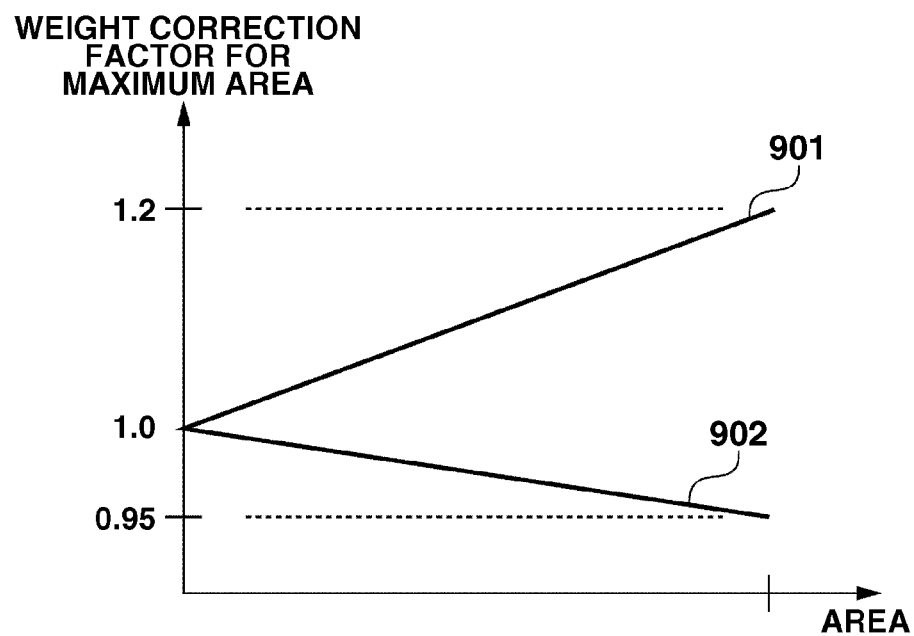

Then, the saturation correction unit 114 determines a final saturation weight correction factor Wc based on the frequency (area) Cp of areas having the hue Hp and the saturation weight correction factor for the maximum area. FIG. 9B is a graph illustrating a relation between the saturation weight correction factor for the maximum area and the area. According to the graph in FIG. 9B, the saturation correction unit 114 calculates a final saturation weight correction factor Wc.

Referring to FIG. 9B, a line 901 illustrates a graph when the saturation weight correction factor for the maximum area is 1.2, and a line 902 illustrates a graph when the saturation weight correction factor for the maximum area is 0.95. When the area is minimized, the saturation weight correction factor is 1.0. When the area is maximized (entire screen), the saturation weight correction factor coincides with the value calculated in FIG. 9A.

Returning to FIG. 7, in step S707, the saturation correction unit 114 omits saturation weight correction by area. Specifically, the saturation weight correction Wc equals 1.0.

In step 708, the saturation correction unit 114 performs loop processing for all blocks illustrated in FIG. 2. Specifically, the saturation correction unit 114 repetitively performs the processing of steps S708 to S713 for all blocks.

Steps S708 and S709 are similar to steps S301 and S302, respectively, illustrated in FIG. 3 according to the first exemplary embodiment. Specifically, the saturation correction unit 114 determines a weight Wf depending on the hue and luminance of each block.

In step S710, the saturation correction unit 114 determines whether the hue of the target block for processing is included in the peak hue Hp. When the hue of the target block for processing is included in the peak hue Hp (YES in step S710), the processing proceeds to step S711. Otherwise, when the hue of the block under processing is not included in the peak hue Hp (NO in step S710), the processing proceeds to step S712.

In step S711, the saturation correction unit 114 corrects the weight Wf calculated in step S709. Specifically, the saturation correction unit 114 multiplies the weight Wf by the saturation weight correction factor Wc by the area determined in steps S706 and S707 (Wf=Wc×Wf) to correct the weight Wf.

In step S712, the saturation correction unit 114 multiplies the saturation value by the weight Wf to correct the saturation value. This processing is similar to the processing of step S303 in FIG. 3 according to the first exemplary embodiment.

The processing by the saturation correction unit 114 in the present exemplary embodiment has been described above.

As described above, the present exemplary embodiment comprises: calculating the saturation, luminance, hue, and color area of an image signal; correcting the saturation based on information about the hue, luminance, and color areas; and determining whether a captured scene is a vivid color scene using the corrected saturation. The saturation correction unit 114 controls the saturation weight correction factor in this way because of the following reason. In a case of a bright color, the larger the area, the brighter and the higher saturation is interpreted by human eyes. In a case of a dark color, the larger the area, the darker and the lower saturation is interpreted by human eyes.

Thus, the saturation value can be corrected according to the characteristics of human eyes visual interpretation of color, enabling vivid color scene determination according to human eyes visual interpretation of color.

Although in the exemplary embodiments, the saturation weight correction factor We is controlled according to the density and area of blocks having a certain hue, but saturation weight correction may also be controlled based on information of either one of the density and area.

Although saturation weight correction is based only on the area of the peak hue Hp in the above-mentioned exemplary embodiments, it may be based on the area of blocks having a similar hue other than the peak hue.

Although saturation weight correction is based on the area in the above-mentioned exemplary embodiments, the saturation may be directly corrected based on area information similar to the modification in the first exemplary embodiment.

An imaging apparatus according to a third exemplary embodiment will be described below with reference to FIGS. 10 to 12.

The third exemplary embodiment will be described below based on a case where the saturation is corrected based on the amount of motion of a subject in addition to the hue and luminance described in the first exemplary embodiment.

Figure 10:
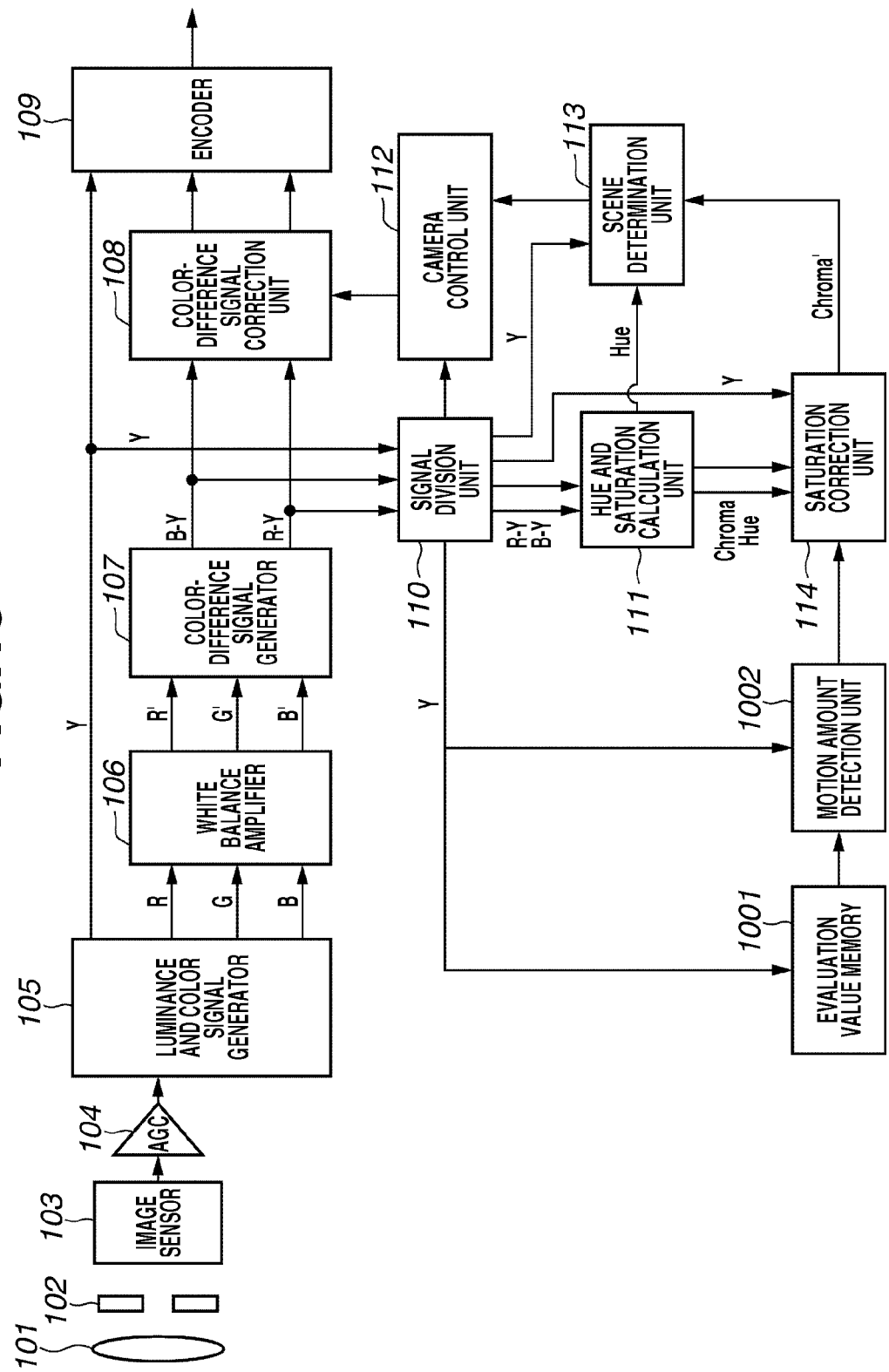
FIG. 10 is a block diagram illustrating a configuration of a third exemplary embodiment.

FIG. 10 is a block diagram illustrating a configuration of the imaging apparatus according to the present exemplary embodiment. Referring to FIG. 10, the same reference numerals as in FIG. 1 denote identical elements and therefore duplicated descriptions will be omitted. In the present exemplary embodiment, an evaluation value memory 1001 and a motion amount detection unit 1002 are added to the configuration in FIG. 1.

Processing by the imaging apparatus illustrated in FIG. 10 will be described below. In the present exemplary embodiment, the processing ranging from image capturing to signal output by the encoder 109 is similar to that in the first exemplary embodiment. Similar to the first exemplary embodiment, the scene determination unit 113 determines whether a captured scene is a vivid color scene and the camera control unit 112 controls parameters of the color-difference signal correction unit 108 based on a result of vivid color scene determination also in the present exemplary embodiment, therefore, detailed descriptions will be omitted.

Similar to the first exemplary embodiment, the signal division unit 110 calculates average values of the luminance signal (Y) and the color-difference signals (R−Y and B−Y) for each block, and outputs the color-difference signals to the hue and saturation calculation unit 111 also in the present embodiment. Then, the signal division unit 110 outputs the luminance signal (Y) to the evaluation value memory 1001 and the motion amount detection unit 1002. The evaluation value memory 1001 stores luminance signals (evaluation values) for all blocks output from the signal division unit 110. The luminance signals (evaluation values) are accumulated in the evaluation value memory 1001 at predetermined intervals. The evaluation value memory 1001 records the luminance signals (evaluation values) for predetermined frames.

The motion amount detection unit 1002 calculates the amount of motion for each block based on the present luminance signal output from the signal division unit 110 and the past luminance signal stored in the evaluation value memory 1001. Specifically, the motion amount detection unit 1002 calculates a temporal distribution value of the luminance signal at a fixed time period for each block, and recognizes the time distribution value as an amount of motion. The motion amount detection unit 1002 outputs the amount of motion calculated for all blocks to the saturation correction unit 114 (motion amount detection step).

The saturation correction unit 114 corrects the saturation value based on the hue, luminance, and amount of motion. Processing (first correction step) by the saturation correction unit 114 is illustrated in FIG. 11.

Figure 11:
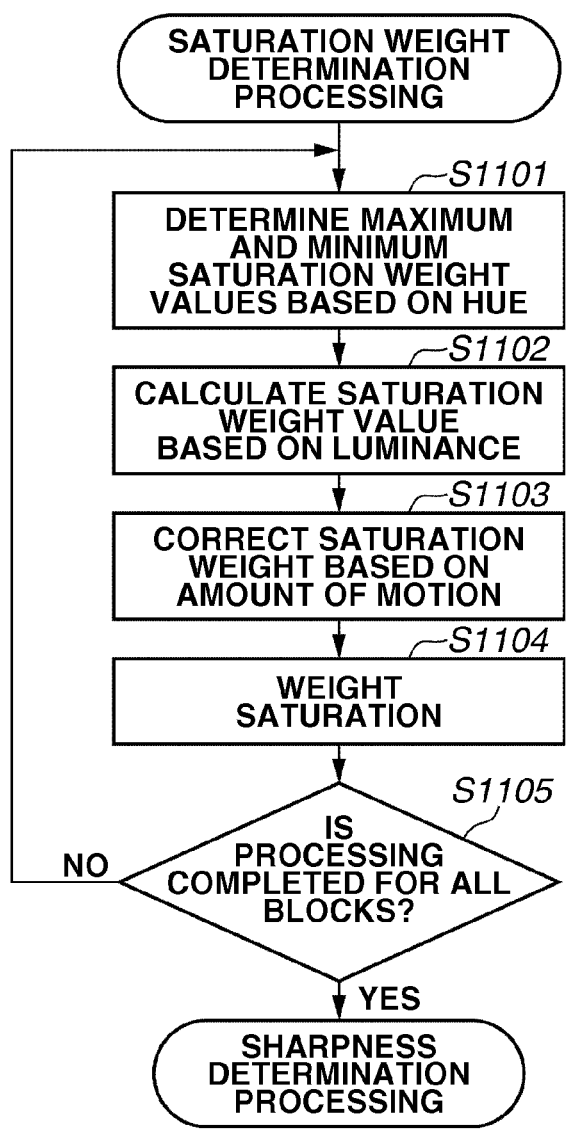
FIG. 11 is a flow chart illustrating processing by the saturation correction unit according to the third exemplary embodiment.
Figure 12:
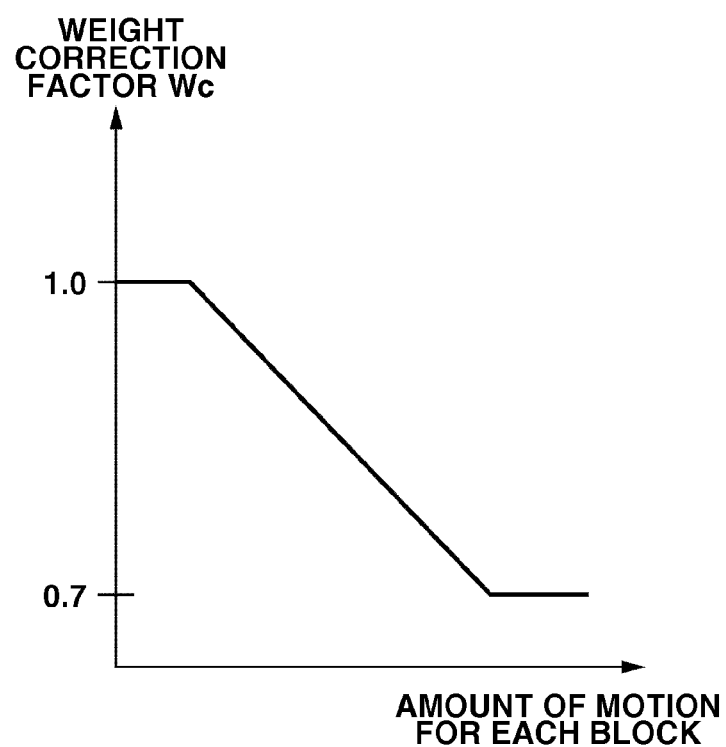
FIG. 12 is a graph illustrating the characteristics of the saturation correction unit according to the third exemplary embodiment.

Referring to FIG. 11, in step S1101, the saturation correction unit 114 performs loop processing illustrated in FIG. 2 for all blocks. Specifically, the saturation correction unit 114 repetitively performs the processing of steps S1101 to S1105 for all blocks.

Steps S1101 and S1102 are similar to steps S301 and S302, respectively, illustrated in FIG. 3 according to the first exemplary embodiment. Specifically, the saturation correction unit 114 determines a weight Wf depending on the hue and luminance of each block.

In step S1103, the saturation correction unit 114 corrects the weight Wf based on the amount of motion. FIG. 12 illustrates a relation between the amount of motion of each block and the saturation weight correction factor Wc. As illustrated in FIG. 12, the saturation correction unit 114 corrects the weight Wf so that the larger the amount of motion of each block, the smaller the weight. The saturation correction unit 114 multiplies the weight Wf by the calculated saturation weight correction factor Wc (Wf=Wc×Wf) to determine a final value of the weight Wf.

In step S1104, the saturation correction unit 114 multiplies the saturation value by the weight Wf to correct the weight Wf. This processing is similar to the processing of step S303 in FIG. 3 according to the first exemplary embodiment.

Processing by the saturation correction unit 114 has been described above. As described above, in the present exemplary embodiment, the saturation value is corrected by the amount of motion in addition to the hue and luminance. The saturation correction unit 114 controls the saturation value in this way because, the larger the motion of a subject or camera, the more difficult it becomes to recognize the subject as a sharp subject even with an identical saturation value. Therefore, correcting the saturation value according to the amount of motion enables vivid color scene determination according to the human eyes visual interpretation of color as much as possible.

While the saturation signal is corrected based on the amount of motion of an image signal, which makes it difficult to determine a scene having a large amount of motion as a vivid color scene in the present exemplary embodiment, the method of saturation signal correction is not limited thereto as long as vivid color scene determination is based on the motion information.

For example, the threshold value (FIG. 6) for vivid color scene determination by the scene determination unit 113 may be changed based on the motion information. In this case, the larger the amount of motion, the higher becomes the average saturation threshold value Ct and the threshold value At of the number of blocks having a saturation equal to or larger than a threshold value (FIG. 6). This makes it difficult to determine a scene having a large amount of motion, as a vivid color scene.

Further, any method for calculating the amount of motion may be used in the present exemplary embodiment. For example, the amount of motion may be calculated using not only the luminance signal but also the color signals.

Although the amount of motion for each block is calculated in the present exemplary embodiment, the amount of motion in the entire image may be calculated. Further, information about an optical system of the imaging apparatus, such as zooming information, may be acquired and used for the calculation of the amount of motion.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-295433 filed Dec. 25, 2009, which is hereby incorporated by reference herein in its entirety.

What is claimed is:

1. A method of image processing comprising:
    acquiring image data captured by an image sensor;
    correcting, by a circuit, chroma information acquired from the image data, based on at least one of hue information and luminance information of the image data;
    determining, by a circuit, whether a scene of an image of the image data is a vivid color scene by using the corrected chroma information, wherein the scene of the image is determined to be a vivid color scene in a case where the corrected chroma information corresponds to a first chroma information and the scene of the image is determined not to be a vivid color scene in a case where the corrected chroma information corresponds to a second chroma information corresponding to lower chroma than the first chroma information; and
    correcting the image data in the case that the scene of the image is determined to be a vivid color scene.

2. The method of image processing according to claim 1, further comprising:
    correcting a chroma of the image data based on the output result of scene determination.

3. The method of image processing according to claim 1, wherein the correction comprises:
    dividing the image data into a plurality of blocks; and
    correcting the chroma information for each block,
    wherein the chroma information for each block is corrected by being multiplied by a weight corresponding to the hue information for each block.

4. The method of image processing according to claim 1, wherein the correction comprises:
    dividing the image data into a plurality of blocks; and
    correcting the chroma information for each block,
    wherein the chroma information is corrected so that a chroma of a first block having first luminance is multiplied by a first weight and a second block having second luminance which is lower than the first luminance is multiplied by a second weight which is lower than the first weight.

5. The method of image processing according to claim 1, wherein the correction comprises:
    correcting the chroma information so that the chroma of the image data is increased when the image data imcludes a hue having an occupation rate higher than a first threshold value, and an area of a pixel group having the hue having the occupation rate higher than the first threshold value composed of adjacent pixels contacting each other is larger than a second threshold value.

6. The method of image processing according to claim 5, wherein the correction comprises;
    correcting the chroma information so that a chroma of the image data is increased when the image data includes a hue having an occupation rate higher than a first threshold value, an area of the hue concentrated in the image data is larger than a second threshold value, and an average luminance of the image data is higher than a third threshold value; and correcting the chroma information so that the chroma of the image data is decreased when the average luminance of the image data is lower than the third threshold value.

7. The method of image processing according to claim 1, wherein motion amount detection is performed to detect from a plurality of the image data an amount of motion of a subject in the image data, and
wherein the correction comprises correcting the chroma information so that the chroma is decreased more when a larger amount of motion is detected in the motion amount detection.

8. The method of image processing according to claim 1, wherein the determination comprises:
dividing an entire image of the image data into a plurality of blocks; and
determining that a scene of the image of the image data is a vivid color scene in a case that a number of blocks having a chroma larger than a fourth threshold value is larger than a fifth threshold value.

9. The method of image processing according to claim 1, wherein the determination comprises:
determining that a scene of the image of the image data is a vivid color scene in a case that average chroma of the image data is higher than a sixth threshold value.

10. An image processing apparatus comprising:
an acquisition unit configured to acquire image data;
a correction unit configured to correct chroma information of the acquired image data based on at least one of hue information and luminance information of the image data;
a determination unit configured to determine whether a scene of an image of the image data is a vivid color scene using the corrected chroma information,
wherein the scene of the image is determined to be a vivid color scene in a case where the corrected chroma information corresponds to a first chroma information and the scene of the image is determined not to be a vivid color scene in a case where the corrected chroma information is a second chroma information corresponding to lower chroma than the first chroma information, and
wherein the correction unit corrects the image data in the case that the scene of the image is determined to be a vivid color scene.

11. An image capturing apparatus comprising:
an imaging unit configured to capture an image of a subject and output image data;
a correction unit configured to correct color saturation information of the image data based on at least one of hue information and luminance information of the image data;
a determination unit configured to determine whether an image of the image data is a vivid color scene based on the color saturation information corrected the correction unit;
an output unit configured to output a result of scene determination by the determination unit;
a display unit configured to display an image of the captured image data and the output result,
wherein the scene of the image is determined to be vivid color scene in a case where the corrected chroma information corresponds to a first chroma information and the scene of the image is determined not to be a vivid color scene in a case where the corrected chroma information is a second chroma information corresponding to a lower chroma than the first chroma information, and wherein the correction unit corrects the image data in the case that the scene of the image is determined to be a vivid color scene.

12. The image capturing apparatus according to claim 11, further comprising:
a recording unit configured to record the captured image data in a recording medium and attach the output result to a header of the captured image data.

13. The image processing apparatus according to claim 10, wherein the correction unit comprises:
a dividing unit configured to divide the image data into a plurality of blocks; and
a correcting unit configured to correct the chroma information for each block,
wherein the chroma information for each block is corrected by being multiplied by a weight corresponding to the hue information for each block.

14. The image processing apparatus according to claim 10, wherein the correction unit comprises:
a dividing unit configured to divide the image data into a plurality of blocks; and
a correcting unit configured to correct the chroma information for each block,
wherein the correction unit corrects the chroma information so that the saturation of a first block having a first luminance is multiplied by a first weight and of a second block having a second luminance which is lower than the first luminance is multiplied by a second weight which is lower than the first weight.

15. The image processing apparatus according to claim 10, wherein the determination unit comprises:
a dividing unit configured to divide the entire image of the image data into a plurality of blocks,
wherein the determining unit determines that a scene of the image of the image data is a vivid color scene in a case that the number of color corrected blocks corresponding to corrected chroma information having a chroma larger than a fourth threshold value is larger than a fifth threshold value.

16. The image processing apparatus according to claim 10, wherein the determination unit determines that a scene of the image of the image data is a vivid color scene in a case that an average of color corrected chroma of the image data corresponding to the corrected chroma information is higher than a sixth threshold value.

17. The method according to claim 1, wherein a scene of an image of the image data is determined to be a vivid color scene in a case where the corrected chroma information corresponds to a chroma higher than a threshold value.

18. An image processing method comprising:
acquiring image data;
correcting chroma information acquired from the image data based on at least one of hue information and luminance information of the image data;
determining whether a scene of an image of the image data is a vivid color scene using the corrected chroma information; and
outputting the result(s) of the scene determination,
wherein the image data is segmented into a plurality of blocks, each block comprising a plurality of pixels, and weights corresponding to hue information of each of the blocks are applied in correcting chroma information for each of the blocks.

19. A method of image processing comprising:
acquiring image data;
obtaining, by a circuit, chroma and luminance information of the image data;

determining, by a circuit, whether a scene of an image of the image data is a vivid color scene using the obtained chroma information such that the scene of the image is more likely to be determined a vivid color scene in a case where the luminance information corresponds to a first luminance information than in a case where the luminance information corresponds to a second luminance information corresponding to lower luminance than the first luminance information; and outputting a result of the scene determination.

20. The method of image processing according to claim 1, further comprising:

displaying an image of the captured image data and a result of the scene determination.

21. The image processing apparatus according to claim 10, further comprising:

a display unit configured to display an image of the captured image data and a result of the scene determination.

22. The method of image processing according to claim 1, further comprising:

recording the captured image data in a recording medium; and attaching a result of the scene determination to a header of the captured image data.

23. The method of image processing according to claim 10, further comprising:

a recording unit configured to record the captured image data in a recording medium and attach a result of the scene determination to a header of the captured image data.

24. The method of image processing according to claim 2, wherein correcting the chroma of the image data includes multiplying the chroma of the image data by a first gain in the case that the scene of the image is determined to be a vivid color scene that is higher than a second gain used in the case that the scene of the image is determined not to be a vivid color scene.

25. The method of image processing according to claim 1, further comprising:

correcting a luminance of the image data based on a result of the scene determination.

* * * * *